(12) United States Patent
Dong et al.

(10) Patent No.: US 7,997,620 B1
(45) Date of Patent: Aug. 16, 2011

(54) ADAPTIVE LOAD-LIMITING SEAT BELT BUCKLE PRESENTER

(75) Inventors: Ke Dong, Troy, MI (US); Jenne-Tai Wang, Rochester, MI (US); Tito R. Huffman, Eastpointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/720,717

(22) Filed: Mar. 10, 2010

(51) Int. Cl.
*B60R 22/20* (2006.01)

(52) U.S. Cl. ............... 280/801.2; 280/805; 280/806; 297/472; 297/478

(58) Field of Classification Search ............... 280/801.2, 280/803, 804, 805, 806; 297/472, 478
See application file for complete search history.

(56) References Cited

U.S. PATENT DOCUMENTS

| | | | | |
|---|---|---|---|---|
| 7,188,868 B2 * | 3/2007 | Yamaguchi | ............ | 280/806 |
| 7,229,100 B2 * | 6/2007 | Cunningham et al. | ........ | 280/806 |
| 7,380,832 B2 * | 6/2008 | Gray et al. | ............ | 280/806 |
| 7,533,902 B2 * | 5/2009 | Arnold et al. | ............ | 280/806 |
| 7,631,900 B2 * | 12/2009 | Nakayama et al. | ........ | 280/806 |
| 7,673,905 B2 * | 3/2010 | Fujii et al. | ............ | 280/806 |
| 7,784,832 B2 * | 8/2010 | Zasu et al. | ............ | 280/807 |
| 7,828,332 B2 * | 11/2010 | Bok et al. | ............ | 280/806 |

* cited by examiner

*Primary Examiner* — Toan C To

(57) ABSTRACT

An adaptive load-limiting seat belt buckle presenter includes a plow assembly movable within a tube and connected to the buckle by cables. Movement of the plow assembly presents the buckle at various positions relative to the occupant. The plow assembly has a plurality of plow elements that engage with the tube to plow troughs in the tube when an occupant restraining load moves the plow assembly within the tube. A plow actuator mechanism selects a number of the plurality of plow elements to be engaged or not engaged with the tube to thereby adapt the load-limiting capability of the presenter. A controller and various sensors cooperate to operate an adjusting motor for translating the plow assembly within the tube to present the buckle at a desired position and to also operate a rotary actuator to select the number of plow elements that will be engaged or not engaged.

20 Claims, 7 Drawing Sheets

ADAPTIVE LOAD-LIMITING SEAT BELT BUCKLE PRESENTER

FIELD OF THE INVENTION

The present invention relates to a seat belt buckle presenter for a vehicle occupant restraining seat belt system and more particularly provides a load-limiting seat belt buckle presenter that adapts its load-limiting performance to actual vehicle and vehicle occupant conditions.

BACKGROUND OF THE INVENTION

Motor vehicles are commonly equipped with a vehicle occupant restraint system including a seat belt that is disposed about the seated occupant and latched via a seat belt buckle. The buckle may be mounted on the vehicle seat or on the vehicle structure.

It has been proposed in the prior art to mount the seat belt buckle on a presenter mechanism which will move the buckle relative to the seated occupant. For example, when the occupant has entered the seat and is ready to buckle the belt, the buckle may be moved more upwardly and forwardly to make the buckle more accessible. Then upon being buckled, the buckle may be withdrawn to location where the seat belt will be effectively positioned in its restraining position about the occupant. In addition, the presenter may be employed to pretension the belt about the occupant.

It would be desirable to provide a seat belt buckle presenter that would also adapt to the particular operating conditions of the vehicle and the occupant to thereby provide optimal restraint of the seated occupant by limiting the seat belt load experienced by the occupant.

SUMMARY OF THE INVENTION

An adaptive load-limiting seat belt buckle presenter according to the present invention includes a support tube fixed on the vehicle and a plow assembly movable within the tube and connected to the buckle so that movement of the plow assembly will present the buckle at various positions relative to the occupant. The plow assembly has a plurality of plow elements that engage with the tube to plow troughs in the tube when the onset of an occupant restraining load on the buckle causes movement of the plow assembly within the tube. The plowing of the troughs will provide a controlled movement of the buckle and also absorb energy, thus limiting the load on the seat belt and occupant. The plow assembly has a plow actuator mechanism by which a selected number of the plurality of plow elements are selectively engageable or not engageable with the tube upon the onset of the occupant restraining load to thereby adapt the load-limiting presenter to sensed conditions of vehicle and occupant usage. A controller and various sensors cooperate to operate an adjusting motor for translating the plow assembly within the tube to present the buckle at a desired position, and to also operate a rotary actuator to select the number of plow elements that will be engaged or not engaged. The sensors can be, for example, one or more of a vehicle speed sensor and occupant weight sensor, or a seat position sensor, a door position sensor, or other sensors.

Further areas of applicability of the present invention will become apparent from the detailed description provided hereinafter. It should be understood that the detailed description and specific examples, while including exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
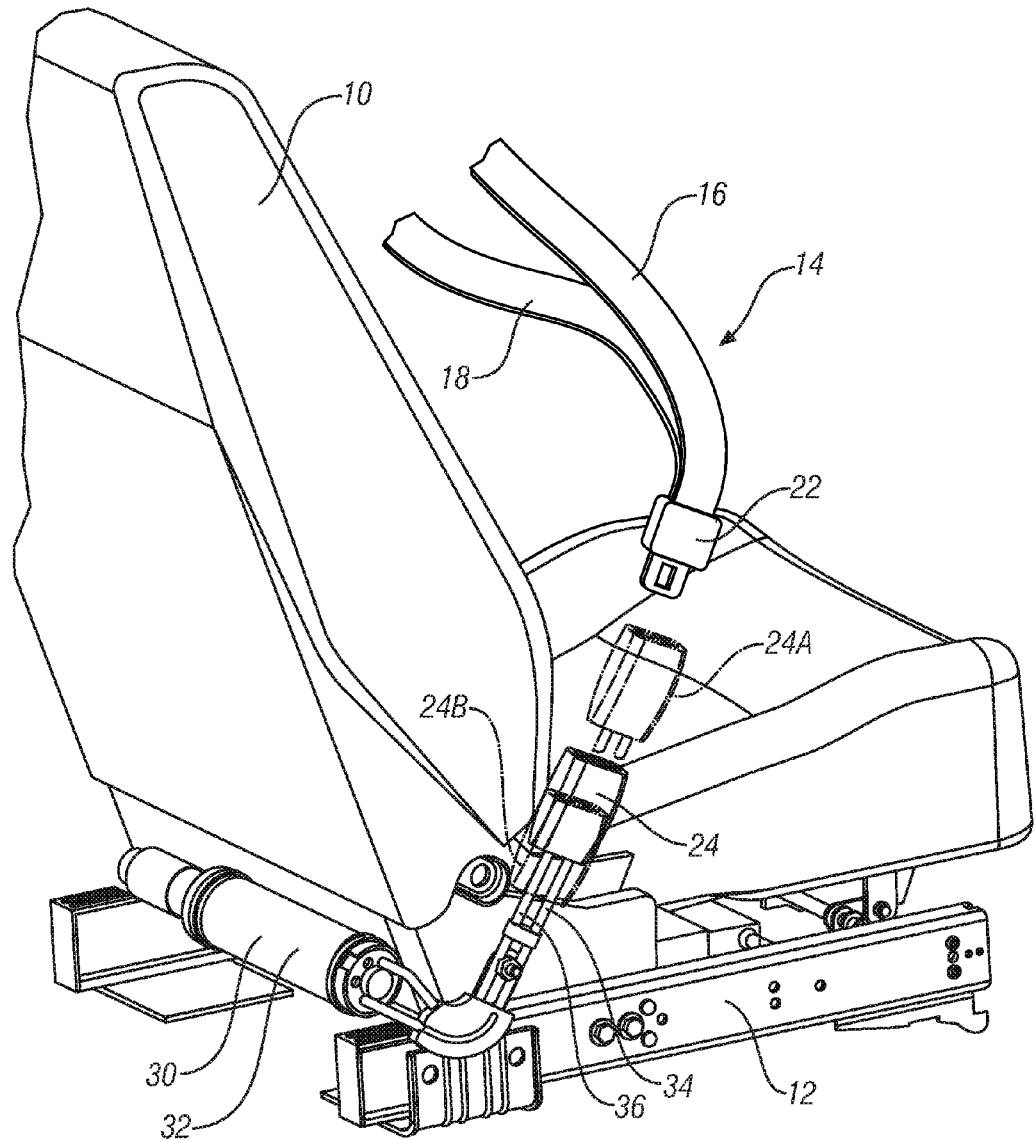
FIG. 1 is a perspective view of a vehicle seat having an adaptive load-limiting seat belt presenter according to the invention.

Referring to FIG. 1, a vehicle seat generally indicated at 10 is mounted in the passenger compartment of a motor vehicle via a seat adjusting mechanism 12 that will permit the seat 10 to be adjusted fore and aft as well as up and down. The vehicle is provided with a conventional occupant restraint system 14 that includes a seat belt assembly. The seat belt assembly includes a shoulder belt 16 and a lap belt 18 that connect at a latch plate 22, and a buckle assembly 24 that is mounted on the vehicle, particularly on the vehicle seat 10, as shown in FIG. 1, or on the seat adjusting mechanism 12, or elsewhere on the vehicle body structure. When the occupant enters the vehicle, the latch plate 22 is gripped and the shoulder belt 16 and lap belt 18 are pulled across the occupant's torso and the latch plate 22 is inserted into the buckle assembly 24. The seated occupant can reach out and close the vehicle door, not shown, either before or after buckling the seat belt 14.

FIG. 1 shows an adaptive load-limiting seat belt buckle presenter, generally indicated at 30. As seen in FIG. 1 the presenter 30 includes a tube 32 mounted behind the seat and a pair of cables 34 and 36 that mount the buckle assembly 24.

Figure 2:
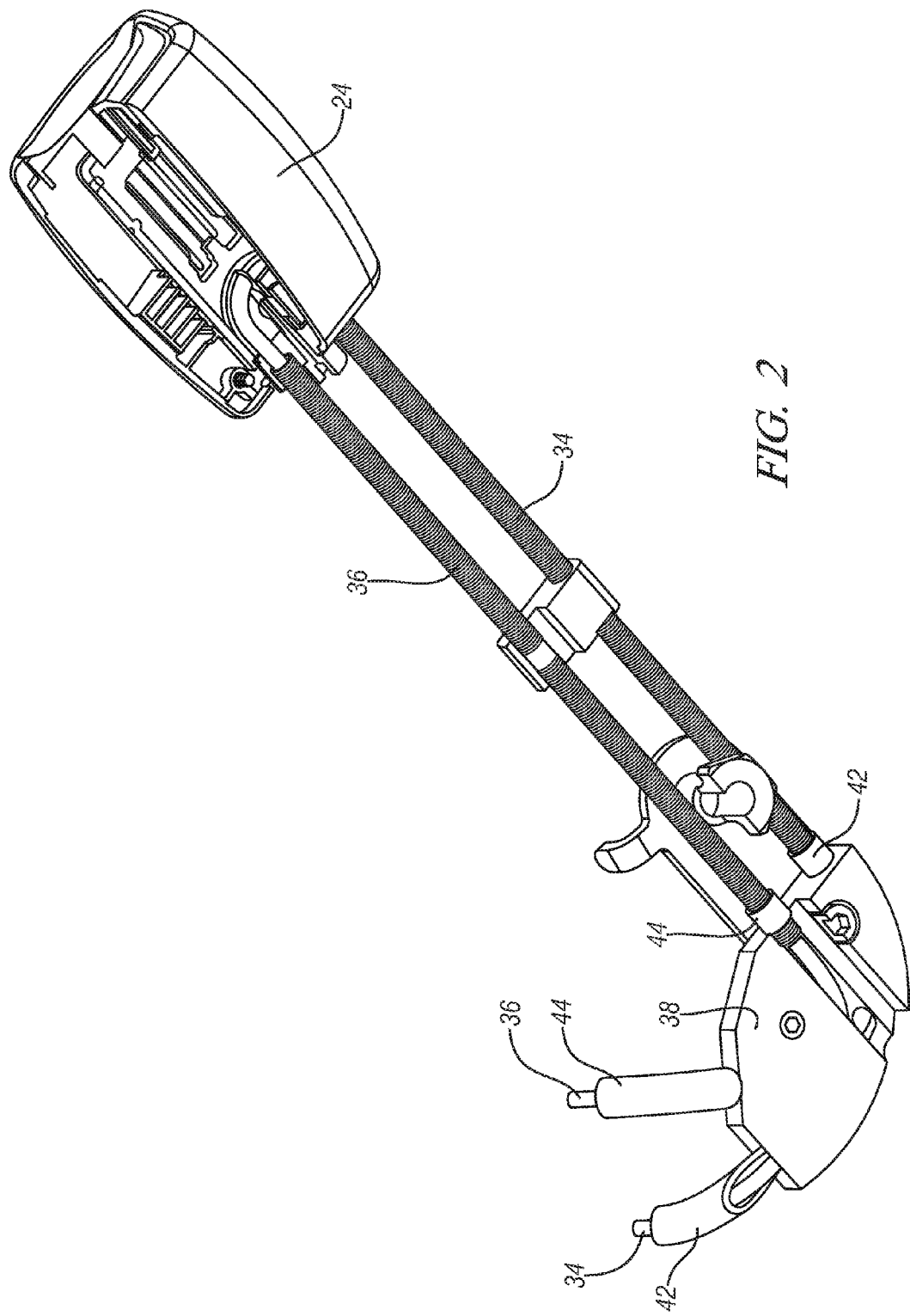
FIG. 2 is a perspective view having parts broken away and in section showing the seat belt buckle.

As seen in FIG. 2, a mounting bracket 38 is mounted on the side of the seat and mounts and guides the cables 34 and 36. In particular, the cable 34 slides through a sheath 42 that is captured within the bracket 38 so that the cable 34 can slide through the sheath 42 and the bracket 38. Likewise, the cable 36 slides within a sheath 44 that is mounted on the bracket 38. Thus, by extending and retracting the cables 34 and 36, the buckle assembly 24 will be moved up and down to its various positions of FIG. 1.

In particular, referring to FIG. 1, it will be understood that the buckle 24 is shown in a normal solid-line indicated position, but can be extended to a phantom-line indicated extended position shown at 24A, or can be retracted somewhat to another phantom-line retracted position 24B in order to pretension the seat belt about the seated occupant in anticipation of a loading of the seat belt by the seated occupant.

Figure 3:
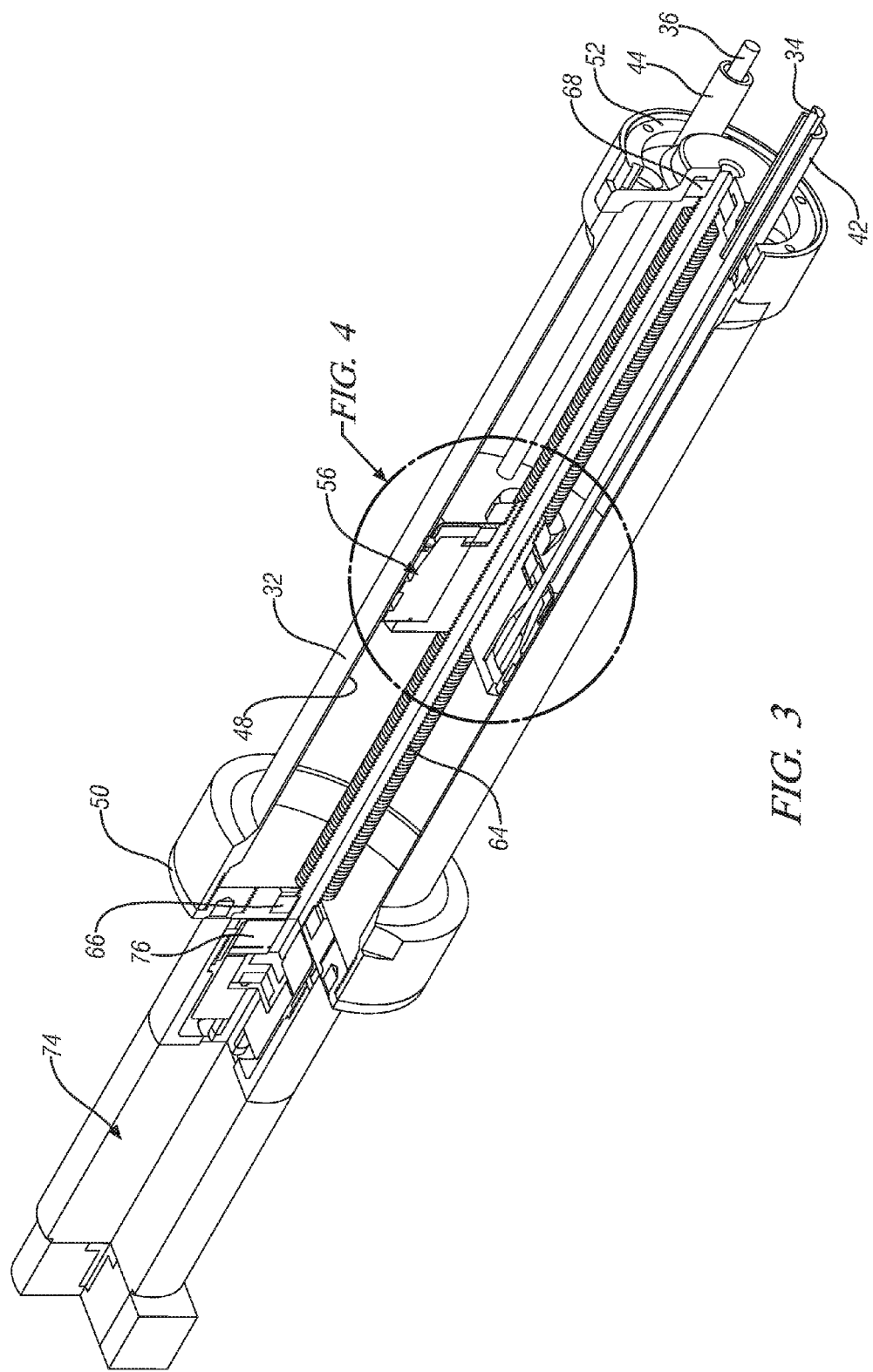
FIG. 3 is a perspective view having parts broken away and in section showing the adaptive load-limiting seat belt presenter.

Referring now to FIG. 3, it is seen that the tube 32 is cylindrical in shape and has a bore 48. The back end of the tube 32 is closed by an end cap 50 and the front end of the tube 32 is closed by an end cap 52. A plow assembly, generally indicated at 56, is slidable within the bore 48 of the tube 32. Cables 34 and 36 enter the end cap 52 and have their respective sheaths 42 and 44 mounted on the end cap 52. The cables 34 and 36 reach into the tube 32 and are suitably attached to the plow assembly 56, as will be discussed further hereinafter, so that the sliding movement of the plow assembly 56 within the tube 32 will extend and retract the cables 34 and 36 to determine the position of the seat belt buckle assembly 24 in FIG. 1. A lead screw 64 has a back end mounted in the end cap 50 by a bearing 66 and a front end that is mounted in the end cap 52 by a bearing 68. A motor, generally indicated at 74, is connected to the lead screw 64 by a connector 76 so that rotation of the motor 74 will rotate the lead screw 64. The lead screw 64 is threadedly connected to the plow assembly 56 as will be discussed in detail hereinafter in reference to FIG. 4. Rotation of the lead screw 64 will cause the plow assembly 56 to be translated and slide within the tube 32 and thereby extend and retract the position of the buckle assembly 24 between the various positions shown in FIG. 1.

Figure 4:
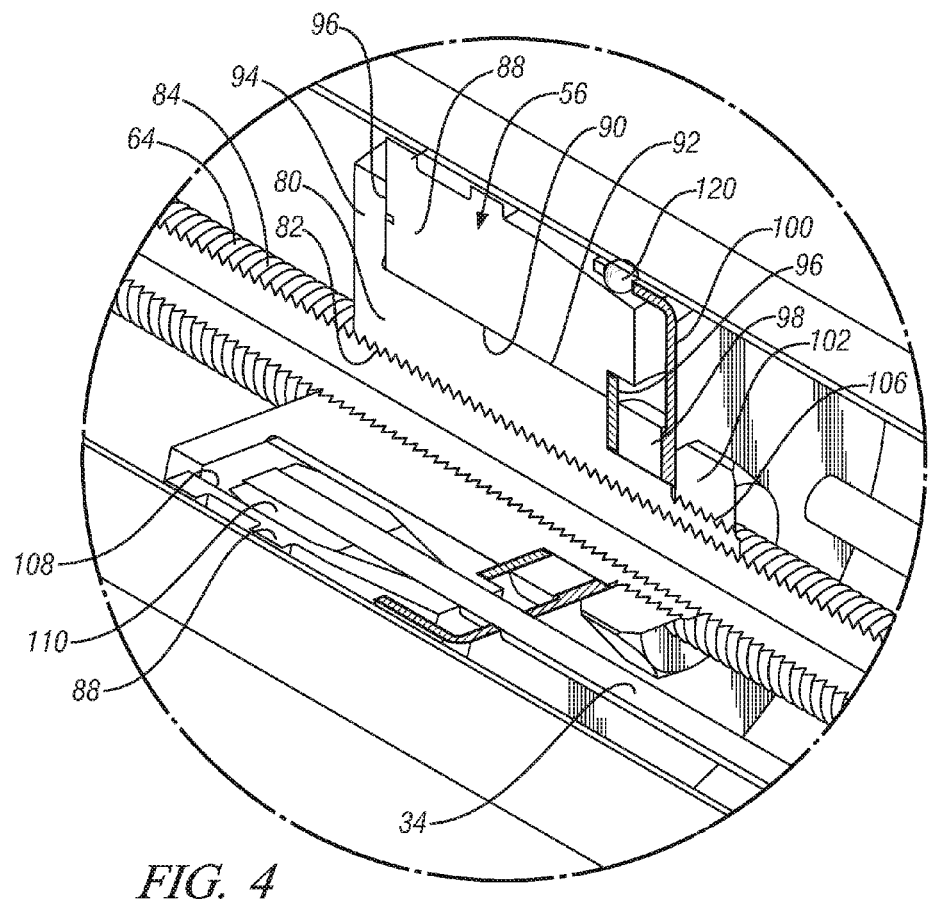
FIG. 4 is an enlarged fragmentary view of a portion of FIG. 3, and having parts broken away and in section to show the plow assembly located within the tube of the adaptive load-limiting seat belt presenter.

Referring to FIG. 4, it is seen that the plow assembly 56 includes a nut 80 that has an internal thread 82 engaging with an external thread 84 of the lead screw 64. A cylindrical plow wedge 88 has a bore 90 that fits over an outer surface 92 of the nut 80. Nut 80 has a shoulder flange 94 at its back end that is engaged by the plow wedge 88 so that rightward movement of the nut 80 will carry the plow wedge 88 in the rightward direction. A washer 96 is held against the front end of the nut 80 by a rotary actuator 98, a cup-shaped cage 100, and a jam nut 102. The jam nut 102 is threaded onto threads 106 that are provided on the nut 80. The rotary actuator 98 includes a stator that is keyed to the nut 80 and a rotor that is keyed to the cage 100 so that the actuation of the rotor 98 will rotate the cage 100.

The end of the cable 34 is attached to the plow wedge 88 by the end of the cable extending into a cavity 108 of the plow nut 88 and a retainer 110 that is swaged onto the end of the cable 34. The cable 36 is similarly attached to the plow wedge 88. Alternatively, the cables 34 and 36 can be attached to the plow wedge 88 by welding, or clamps, or other fasteners.

Figure 5:
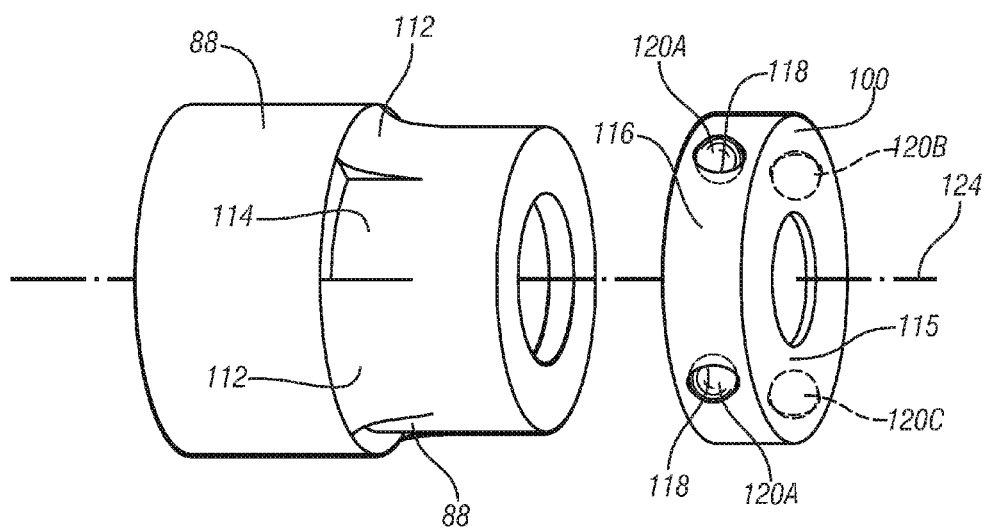
FIG. 5 is a perspective view showing the plow wedge and the plow elements of the plow assembly.

Referring now to FIG. 5, the plow wedge 88 and the cage 100 are shown in an exploded perspective. The plow wedge 88 includes ramp surfaces 112 and axial dwell surfaces 114 that are alternately positioned around the circumference of the cylindrical plow wedge 88. In addition, as seen in FIG. 5, the cage 100 is cup-shaped, with a radial wall 115 and a cup wall 116 so that the cage 100 fits over the end of the plow wedge 88. The cup wall 116 of the cage 100 has a plurality of round openings 118. A plow element, in particular a ball 120A, 120B, 120C, and 120D, is loosely set within each of the round openings 118. Accordingly, it will be understood that rotating the cage 100 about a central axis, designated 124, will reposition the balls 120A, 120B, 120C, and 120D, and determine whether these plow element balls will register with either a ramp surface 112 or an axial dwell surface 114.

Figure 6:
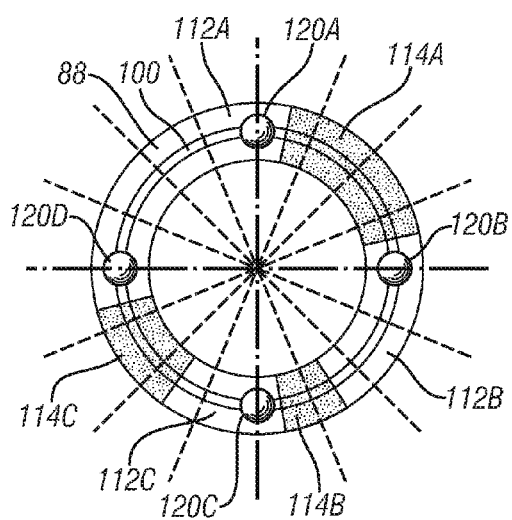
FIGS. 6, 7, 8, and 9 are cross-section views taken through the plow assembly and showing the various positions in which one, two, three or four of the plow elements are positioned for energy absorbing engagement with the tube upon the onset of a vehicle occupant restraint load.

FIG. 6 is a schematic to show the relative circumferential positions of the balls and the ramp surfaces 112 and axial dwell surfaces 114. It is seen that the balls 120A, 120B, 120C, and 120D are spaced equidistant around the circumference of the cage 100. FIG. 6 also shows that the plow wedge 88 has ramp surfaces 112A, 112B, and 112C that are separated by axial dwell surfaces 114A, 114B and 114C. Although the balls 120A, 120B, 120C, and 120D are spaced equidistant, it will be noted that the ramp surfaces 112A, 112B, and 112C vary in their circumferential extent so that each subtends a different arc. Likewise, the axial dwell surfaces 114A, 114B, and 114C vary in their circumferential extent so that each subtends a different arc.

In FIG. 6, the cage 100 has been rotated to a rotary position by the rotary actuator 98 such that the balls 120A, 120B, 120C, and 120D are registered respectively with the ramp surfaces 112A, 112B, 112C. Thus, all four of the plow elements are registered with a ramp surface.

Figure 7:
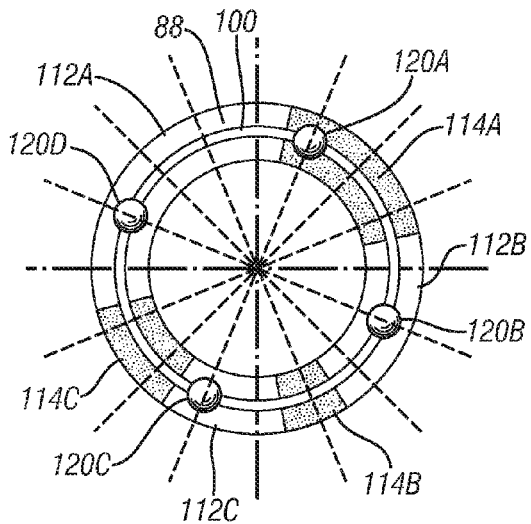

In FIG. 7, the cage 100 has been rotated to a rotary position by the rotary actuator 98 such that the balls 120B, 120C, and 120D are registered respectively with the ramp surfaces 112B, 112C, and 112A. The ball 120A has registered with the axial dwell surface 114A. Thus, three of the balls are registered with ramp surface and one ball is registered with an axial dwell surface.

Figure 8:
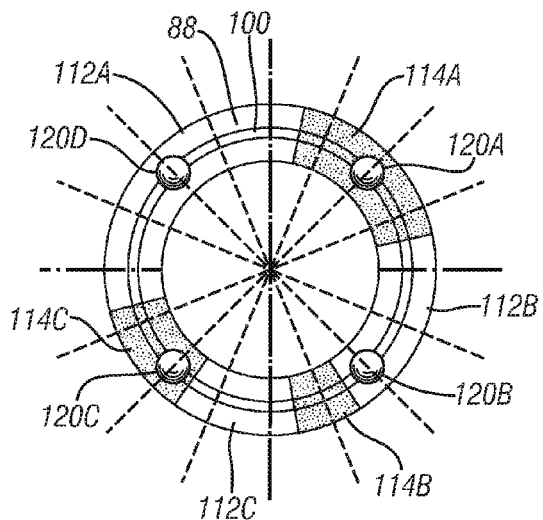

In FIG. 8, the cage 100 has been rotated to a rotary position by the rotary actuator 98 such that the balls, 120B and 120D are registered respectively with the ramp surfaces 112B and 112A. The balls 120A and 120C have registered with the axial dwell surfaces 114A and 114C.

Figure 9:
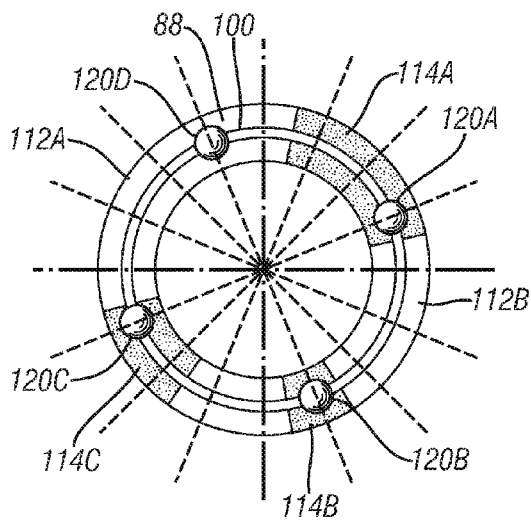

In FIG. 9, the cage 100 has been rotated to a rotary position by the rotary actuator 98 such that only the ball 120D is registered with ramp surface 112A. The other three balls 120A, 120B, and 120C have registered with the axial dwell surfaces 114A, 114B, and 114C.

Figure 10:
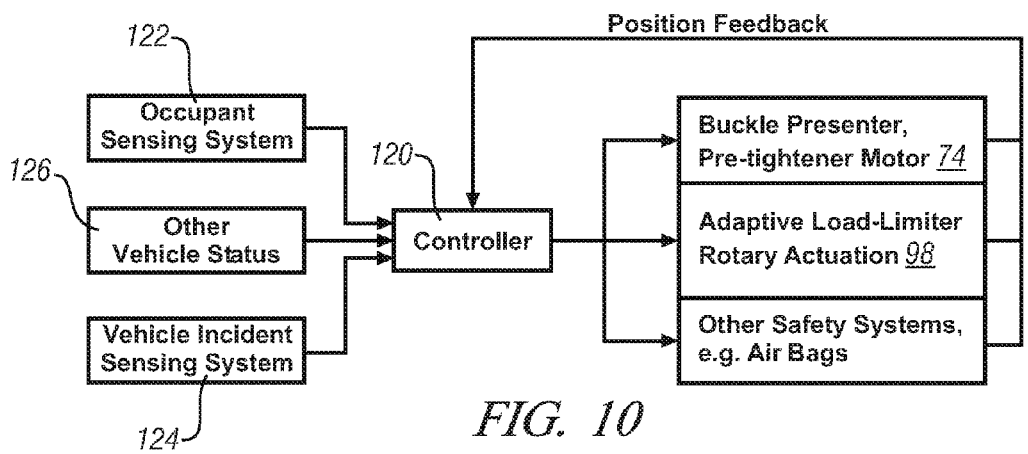
FIG. 10 shows a controller and sensors for controlling the seat belt presenter of this invention.

FIG. 10 shows a sensor and control system for operating the motor 74 and the rotary actuator 98. Controller 121 receives inputs from an occupant sensing system 122, a vehicle incident sensing system 123, as well as other vehicle status inputs 126. The occupant sensing system will typically include an occupant weight sensor and a seat position sensor. The vehicle incident sensing system 123 will typically include airbag sensors and or a radar, infrared, or other collision sensor. The other vehicle status inputs 126 may include inputs such as vehicle speed, door position sensor, etc. The controller 121 processes the inputs and energizes the motor 74 and the rotary actuator 98.

Figure 11:
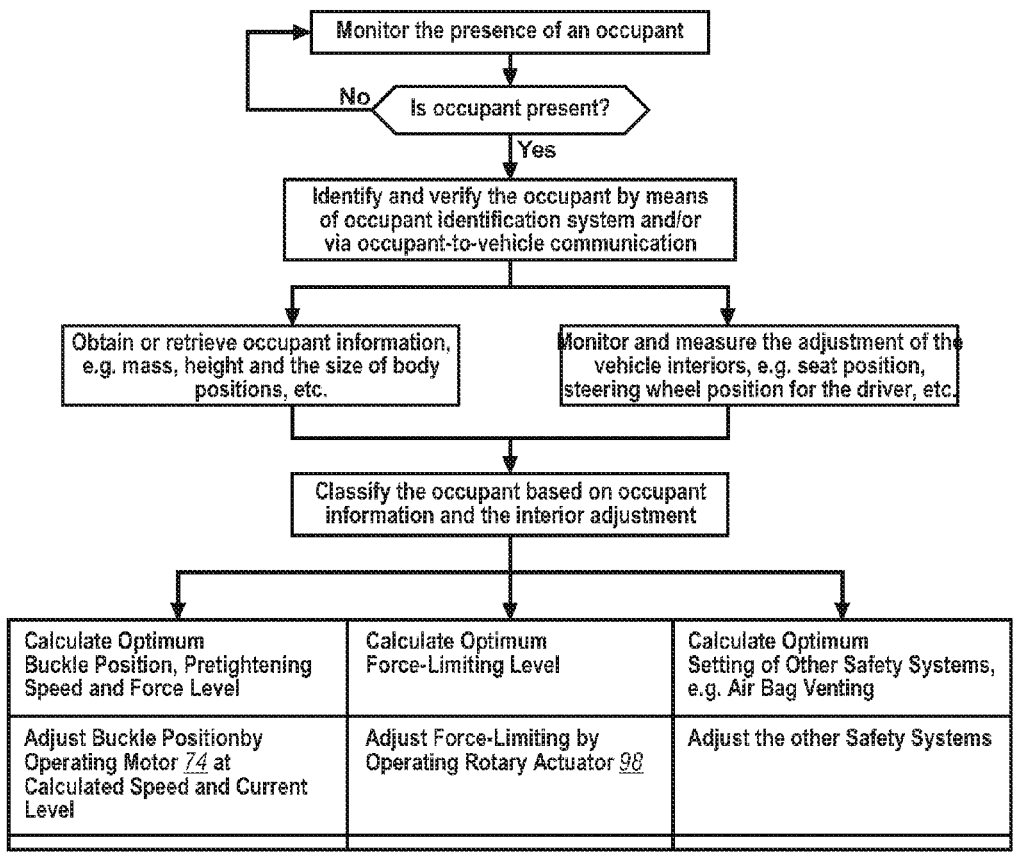
FIG. 11 shows an algorithm for monitoring the presence of the occupant and operating the buckle positioned and the adaptive load limiter.

FIG. 11 shows an algorithm for the occupant sensing system 122. And, FIG. 12 shows an algorithm for the vehicle incident sensing system 123.

Operation

Referring to FIG. 1, when the occupant enters the vehicle, the seat belt buckle assembly 24 will preferably be located at its normal position 24 so that the buckle 24 does not obstruct the occupant's entry into the seat 10. Then, upon closing of the door or the presence of occupant weight on the seat, the occupant sensing system 122 will operate the motor 74 of seat belt presenter 30 to extend the buckle assembly 24 to the position 24A where it will be readily accessible for the seated occupant to insert the latch plate 22 into the buckle 24. Then, the occupant sensing system 122 will operate the motor 74 to rotate the lead screw 64 and thereby move the nut 80 of plow wedge 88 leftward within tube 32 so that the cables 34 and 36 will reposition the buckle 24 to the normal buckle position 24.

Figure 12:
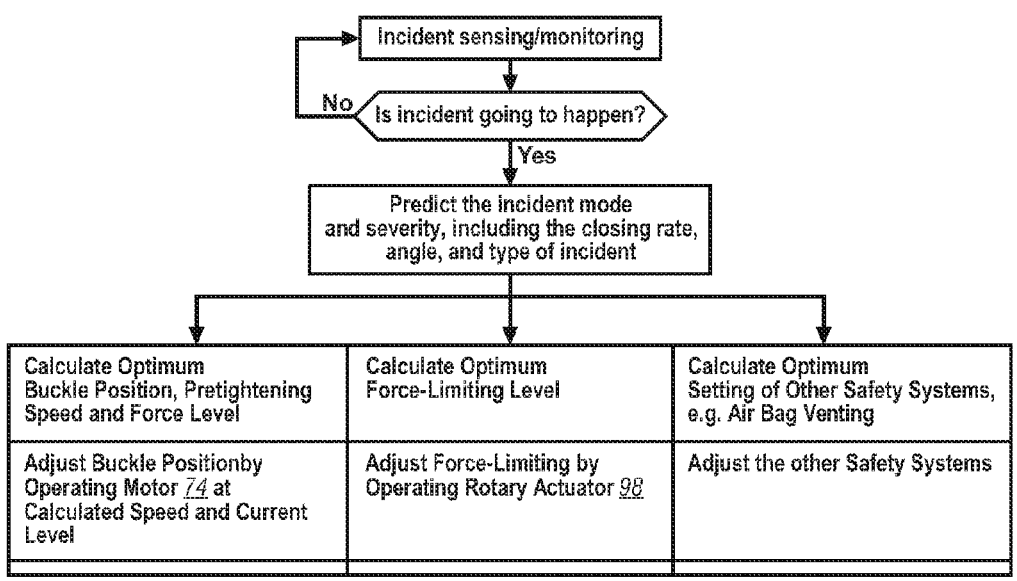
FIG. 12 shows an algorithm for monitoring the presence of the occupant and operating the buckle positioned and the adaptive load limiter.

As the vehicle is driven, the occupant sensing system 122, the vehicle incident sensing system 123, and the other vehicle status signal inputs 126 will continuously monitor the occupant and vehicle conditions and adjust the motor 74 and rotary actuator 98 in accordance with the algorithms of FIGS. 11 and 12.

Figure 13:
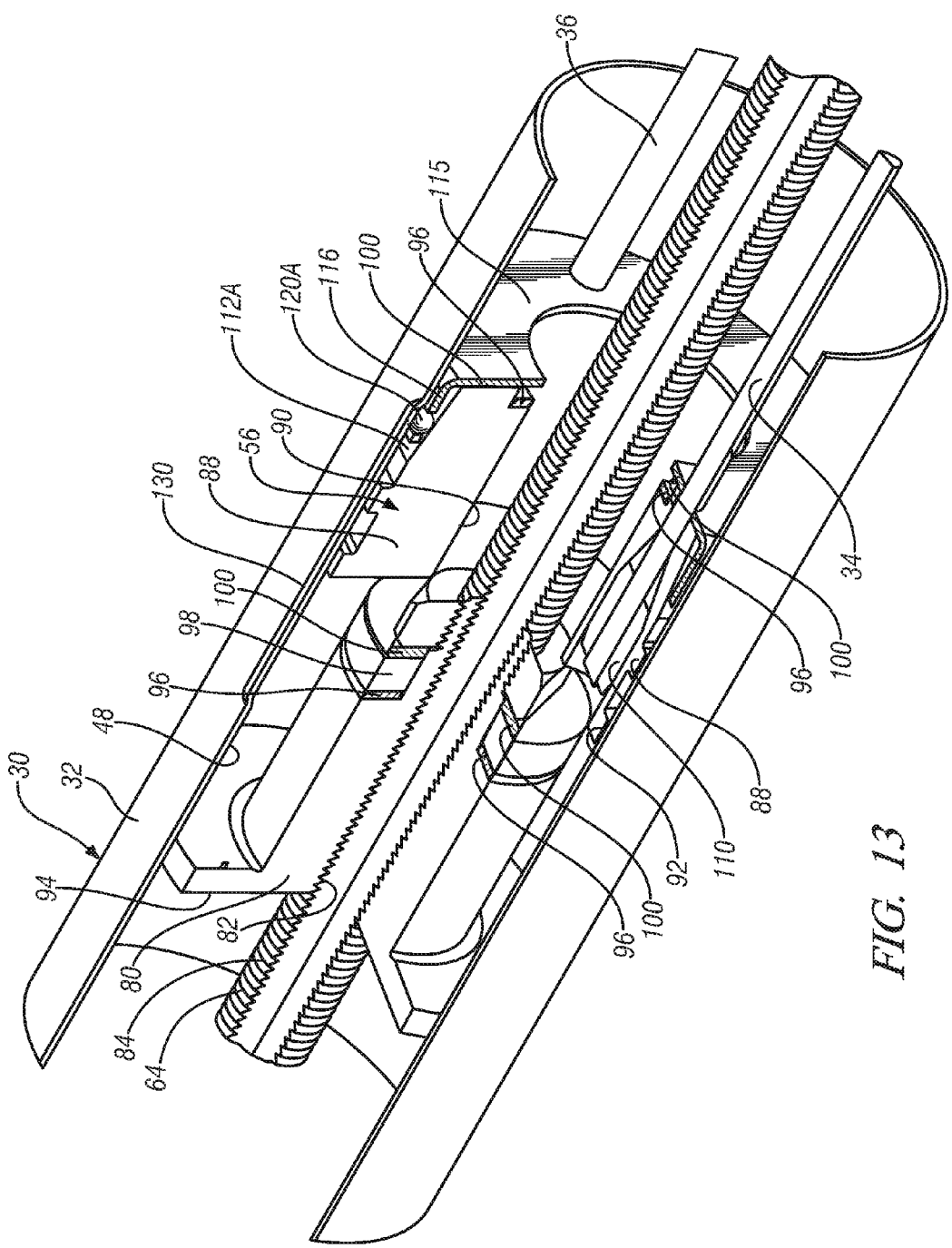
FIG. 13 is a view similar to FIG. 4 but showing the operation of the plow assembly during the loading of the seat belt by the occupant.

Referring to FIG. 13, it is seen that a vehicle incident has occurred in which the seated vehicle occupant has imposed a substantial load on the seat belt system and that the load has been transmitted through the cables 34 and 36 and has caused the plow assembly 56 to be moved rightward within the tube 32. In particular, it will be understood that the nut 80 is threadedly engaged on the lead screw 64 and therefore will not move during the loading of the seat belt system. Instead, the plow assembly 56, in particular the plow wedge 88, has moved rightward in relation to the nut 80 as permitted by the fracture or bending of the washer 96 and the fracture or bending of the radial wall 115 of the cage 100. In addition, the cage 100 has lagged behind the rightward movement of the plow wedge 88 so that the ball 120A has ridden up the ramp surface 112A and plowed a trough 130 in the wall 32 of the tube as the plow wedge has been pulled to the right by the occupant restraint force acting on the cables 34 and 36. Thus the breading or bending of the washer 96 and the breaking or bending of the radial wall 115 of the cage 100 have cooperated to provide a releasable connection between the nut 80 and the plow wedge 88 that release in response to the onset of the occupant restraining load that is imposed upon the plow wedge by the cables 34 and 36 attached to the buckle assembly 24

It will be understood that the plowing of the trough 130 by the ball 120A has permitted the rightward excursion of the buckle to limit the restraint load experienced by the occupant and to absorb energy. In addition, it will be understood that the magnitude of the energy absorption will be dependent upon how many of the plow elements were registered with one of the ramp surfaces at the onset of the loading of the seat belt by the occupant. Thus, by rotating the cage 100 to the various positions of FIGS. 6, 7, 8, and 9, the load limiting function provided by the plow assembly 56 can be adjusted to provide optimal restraint to the occupant. This adjustment is provided according to the algorithms of FIGS. 11 and 12.

In addition, it will be understood that the load limiting function can also be adjusted by modifying the number of plow elements, by varying the steepness of the ramp surfaces, by modifying the hardness and wall thickness of the tube, or varying the gap between the ramp surfaces 112A, 112B, 112C and the bore 48 of the tube 30. In addition the shape and size of the plow elements can be modified so that depth and or width of the trough being plowed can be varied.

Thus, it is seen that the invention provides a seat belt buckle presenter that adapts to the particular operating conditions of the vehicle and the occupant to provide optimal restraint of the seated occupant by limiting the seat belt load experienced by the occupant.

What is claimed is:

1. An adaptive load-limiting seat belt buckle presenter for the restraint of an occupant in a vehicle comprising:
   a support tube fixed on the vehicle;
   a plow assembly movable within the tube and connected to the buckle so that movement of the plow assembly will present the buckle at a selected position relative the occupant;
   said plow assembly having a plurality of plow elements selectively engageable with the tube to plow troughs in the tube when the onset of an occupant restraining load on the buckle causes movement of the plow assembly within the tube;
   and said plow assembly having a plow actuator mechanism by which a selected number of the plurality of plow elements are selectively engageable or not engageable with the tube upon the onset of occupant restraining load to thereby adapt the presenter to sensed conditions of vehicle and occupant usage.

2. The adaptive load-limiting seat belt buckle presenter of claim 1 further comprising said plow assembly including a nut threadedly engaging a lead screw that is rotated by an adjusting motor to translate the plow assembly within the tube and thereby present the buckle at selected positions relative the seated occupant.

3. The adaptive load-limiting seat belt buckle presenter of claim 2 further comprising the presentation of the buckle including at least a position where the buckle is located to provide effective restraint of the occupant, and one or more positions including an extended position where the buckle is more accessible to the occupant for buckling or unbuckling and a retracted position in which the belt is pre-tightened about the occupant in anticipation of an occupant restraining load.

4. The adaptive load-limiting seat belt buckle presenter of claim 2 further comprising a controller and sensors cooperating to operate the adjusting motor and thereby translate the plow assembly within the tube in response to sensed conditions.

5. The adaptive load-limiting seat belt buckle presenter of claim 4 further comprising the sensed conditions being one or more of vehicle speed, door position, adjusted position of the seat, and occupant weight.

6. The adaptive load-limiting seat belt buckle presenter of claim 2 further comprising said plow assembly including a plow wedge carried by the nut having a plurality of ramp surfaces and dwell surfaces alternately spaced around the circumference of the plow wedge with the plow elements registered with either a dwell surface or a ramp surface, the registering of a plow element with a dwell surface withdrawing the plow element from being engageable with the tube and the registering of the plow element with the ramp surface positioning the plow element for engagement with the tube upon the onset of occupant restraint load.

7. The adaptive load-limiting seat belt buckle presenter of claim 6 further comprising said plow elements being carried by a cage rotatable relative the plow wedge to thereby carry the plow elements into selected registry with either a dwell surface or a ramp surface.

8. The adaptive load-limiting seat belt buckle presenter of claim 7 further comprising said plow elements carried by the cage and said ramp surfaces on the plow wedge being arranged circumferentially such that upon the rotary positioning of the cage a selected number of the plow elements will be registered with the ramp surface in readiness for engagement with the tube upon the onset of an occupant restraint load.

9. The adaptive load-limiting seat belt buckle presenter of claim 7 further comprising a rotary actuator acting between the plow wedge and the cage to rotate the cage and the plow elements therewith to a selected rotary position where a selected number of the plow elements will be registered with the inclined ramp surface in readiness for engagement with the tube upon the onset of an occupant restraint load.

10. The adaptive load-limiting seat belt buckle presenter of claim 9 further comprising a controller and sensors cooperating to operate the rotary actuator and thereby register a selected number of plow elements with the ramp surfaces in response to sensed conditions.

11. The adaptive load-limiting seat belt buckle presenter of claim 9 further comprising an occupant sensing system and a vehicle incident sensing system operating the rotary actuator to rotate the cage and register a selected number of the plow elements with the inclined ramp surfaces to provide optimal energy absorption and load-limiting travel of the plow wedge upon the onset of the occupant restraint load.

12. The adaptive load-limiting seat belt buckle presenter of claim 1 further comprising a motor energizable to translate the plow assembly within the tube and thereby present the buckle at the desired position relative to the occupant and the rotary actuator carried by the plow assembly and operable to select the number of the plurality of plow elements that will be engageable with the tube upon the onset of occupant restraining load to thereby adapt the presenter to sensed conditions of vehicle and occupant usage.

13. The adaptive load-limiting seat belt buckle presenter of claim 12 further comprising a vehicle incident sensing system operating the motor to translate the plow wedge to the optimal position for presenting the buckle relative to the seated occupant and operating the rotary actuator to select a number of the plow elements for engagement with the tube to provide optimal energy absorption and limiting travel of the plow edge upon the onset of the occupant restraint load and release of the releasable connection.

14. The adaptive load-limiting seat belt buckle presenter of claim 2 further comprising a releasable connection within the plow assembly that releases upon the onset of the occupant restraint load imposed on the plow assembly and allows the plow elements to engage with the tube and plow the load-limiting trough in the tube.

15. The adaptive load-limiting seat belt buckle presenter of claim 6 further comprising a releasable connection between the plow wedge and the nut so that the plow wedge normally translates within the tube with the nut but the plow assembly is released from the nut upon the onset of the occupant restraint load imposed on the plow wedge and allows the plow elements to engage with the tube and plow a load-limiting trough in the tube.

16. An adaptive load-limiting seat belt buckle presenter for the restraint of an occupant in a vehicle comprising:
 a support tube fixed on the vehicle and having a tube wall defining a bore;
 a plow wedge movable within the tube and connected to the buckle by cables so that movement of the plow wedge within the tube will present the buckle at a selected position relative the occupant, said plow wedge having a cylindrical outer surface facing the bore of the tube and having axial extending dwell surfaces and inclined ramp surfaces that are alternatively spaced around the cylindrical outer surface;
 a threaded screw rotatably mounted within the tube;
 a nut riding on the screw and connected to the plow wedge by a releasable connection that normally couples the plow wedge to the screw so that rotation of the screw will translate the plow wedge within the tube and thereby present the buckle at a selected position, said releasable connection releasing in response to the onset of a occupant restraining load imposed on the plow wedge by the cables to allow movement of the plow wedge toward the occupant;
 a motor for selectively rotating the screw;
 a cage carrying a plurality of plow elements and positioning the plow elements between the wall of the tube and the circumferential outer surface of the plow wedge; and,
 a rotary actuator acting to rotate the cage relative the plow wedge so that a selected number of the plurality of plow elements are registered with an inclined ramp surface and upon the release of the plow wedge from the nut the plow elements will ride up the inclined ramp surface and plow a trough in the tube wall to absorb energy and limit the magnitude of the occupant restraining load experienced by the occupant.

17. The adaptive load-limiting seat belt buckle presenter of claim 16 further comprising the plow elements being round balls.

18. The adaptive load-limiting seat belt buckle presenter of claim 17 comprising the cage having a radial wall that is carried by the plow wedge until released therefrom and a cup wall that carries the plow elements.

19. The adaptive load-limiting seat belt buckle presenter of claim 17 further comprising an occupant sensing system and a vehicle incident sensing system operating the motor to rotate the screw and thereby translate the plow wedge to the optimal position for presenting the buckle relative to the occupant and operating the rotary actuator to rotate the cage and register a selected number of the plow elements with the inclined ramp surfaces to provide optimal energy absorption and limiting travel of the plow edge upon the onset of the occupant restraint load and release of the releasable connection.

20. An adaptive load-limiting seat belt buckle presenter for the restraint of an occupant in a vehicle comprising:
 a support tube fixed on the vehicle and having a tube wall defining a bore;
 a plow wedge movable within the tube and connected to the buckle by cables so that movement of the plow wedge within the tube will present the buckle at a selected position relative the occupant, said plow wedge having a cylindrical outer surface facing the bore of the tube and having axial extending dwell surfaces and inclined ramp surfaces that are alternatively spaced around the cylindrical outer surface;
 a threaded screw rotatably mounted within the tube;
 a nut riding on the screw and connected to the plow wedge by a releasable connection that normally couples the plow wedge to the screw so that rotation of the screw will translate the plow wedge within the tube and thereby present the buckle at a selected position, said releasable connection releasing in response to the onset of a occupant restraining load imposed on the plow wedge by the cables;
 a motor for selectively rotating the screw;
 a cage carrying a plurality of plow elements and positioning the plow elements between the wall of the tube and the outer circumferential face of the plow wedge;
 a rotary actuator acting to rotate the cage relative the plow wedge so that a selected number of the plurality of plow elements are registered with an inclined ramp surface and upon the release of the plow wedge from the nut the plow elements will ride up the inclined ramp surface and plow a trough in the tube wall to absorb energy and limit the magnitude of the occupant restraining load experienced by the occupant;

and an occupant sensing system and a vehicle incident sensing system operating the motor to rotate the screw and thereby translate the plow wedge to the optimal position for presenting the buckle relative to the occupant and operating the rotary actuator to rotate the cage and register a selected number of the plow elements with the inclined ramp surfaces to provide optimal energy absorption and travel limiting travel of the plow wedge upon the onset of the occupant restraint load and release of the releasable connection.

\* \* \* \* \*